Patented Aug. 11, 1953

2,648,645

UNITED STATES PATENT OFFICE 2,648,645

CEMENT COMPOSITION WITH ADDITIVE TO REDUCE WATER LOSS FROM A SLURRY THEREOF

Matthew J. Boris, East Chicago, Ind., and Norman C. Ludwig, Chicago, Ill., assignors to Universal Atlas Cement Company, a corporation of Indiana No Drawing. Application January 24, 1951,
Serial No. 207,664

6 Claims. (Cl. 260—29.6)

This invention relates to a cement composition slurries of which exhibit a low water loss, and are therefore particularly adapted for cementing oil wells.

The rapid loss of water from a slurry of ordinary Portland cement, when placed against a porous formation, is a serious handicap in well-cementing operations. It prevents the slurry from penetrating the formation as deeply as desired and causes excessive back pressures to build up in the casing through which the slurry is pumped. A modified cement composition yielding slurries with a low water loss is disclosed in an application of Norman C. Ludwig, Serial No. 704,295, filed October 18, 1946, now Patent No. 2,576,955, for Low-Water-Loss Cement. That composition is Portland cement with additions of from .025 to 5% of polyvinyl alcohol and from .02 to .05% of a defoaming agent, both by weight of cement. In such composition the polyvinyl alcohol (PVA) imparts the desired low water-loss characteristic and the defoaming agent minimizes the foam-stabilizing property of the polyvinyl alcohol.

Both the additives used in the modified composition referred to above increase the cost of the cement to the user and this naturally restricts the sale thereof despite the desirable properties achieved by the additives. We have discovered that the addition of a further modifying agent to said composition materially reduces the amount of PVA needed to produce a given water-retention characteristic. The cost of our additional modifier is negligible and it accordingly permits low-water-loss cement to be made at a considerably lower cost than heretofore possible.

Our invention, stated briefly, is a cement composition having from .1 to 1% or 2% PVA added to reduce water loss, a small amount of a defoaming agent to minimize foam stabilization, and a third addition agent which increases the effectiveness of PVA as a water-retention agent. This third addition agent is boric acid (i. e., ortho-boric, meta-boric or tetra-boric) or alkali salts thereof. Sodium tetraborate, commonly known as borax is the preferred salt but others may be used as well as the acids themselves. The amount of the third modifying agent varies with the amount of PVA used. Generally, from .02 to .30% by weight of cement may be used although from .06 to .24% is usually to be preferred. With such addition of a boric acid or an alkali salt thereof to a cement mix including PVA and a defoaming agent, the amount of PVA may be kept below 1% without impairing the water-retention property. With this reduction in the amount of PVA, less defoaming agent is needed and a double economy is thereby effected.

The results of tests performed on slurry samples made from our improved composition, as set forth in detail herebelow, will indicate sufficiently the preferred composition. In all the tests listed, ASTM Type II Portland cement was used, a typical analysis thereof being as follows:

| Cement | Oxide Analysis_Percent) | | | | | | | Loss on Ignition | Wagner Surface, cm.²/g. |
|---|---|---|---|---|---|---|---|---|---|
| | SiO₂ | Al₂O₃ | Fe₂O₃ | CaO | MgO | MnO | S0₃ | | |
| ASTM Type II | 22.2 | 5.0 | 4.2 | 64.1 | 1.0 | 0.16 | 1.8 | 0.94 | 1,870 |

All slurries were made by mixing in a mechanical mixer 100 parts cement with 60 parts water by weight after blending the dry additives (PVA and borax) with the cement. The defoaming agent (tributyl phosphate) was added to the water in the amount of .015 to .12% by weight of cement. The water-loss tests were made with a Baroid Wall-building Tester in accordance with the method given in the API Code No. 29, "Standard Field Procedure for Testing Drilling Fluids." The cement slurry was mixed with a Kitchen Aid, Model K 4-B mixer equipped with a wire whip beater and operated at the No. 4 speed control. The mixing was continued for ten minutes for the room temperature tests. For the 150° F. tests, the slurry was mixed one minute at room temperature and then transferred into a metal mixing cell which fits into a water bath controlled at 150° F. and the mixing was continued for ten minutes. For the high-temperature tests, the wall-building tester was preheated to 150° F. with a circular electric heating coil.

Table I below gives specific examples of the invention showing the effect of borax (sodium tetraborate) on the water-loss of slurries consisting of 100 parts ASTM Type II cement, 60 parts water, 0.125 to 1.0 parts PVA and .015 to .12% tributyl phosphate (defoaming agent) both by weight of cement. In these examples, modified starch (thin-boiling starch or dextrin) was used as a retarder, in accordance with known procedure.

TABLE I

Composition:
ASTM Type II Cement + 60% Water
Borax, PVA and Starch, Percent by Weight of Cement

| Test No. | Borax, Percent | PVA, Percent | Modified Starch | Tributyl Phosphate, ml./sack | Water-Loss, No. 50 Paper | | | |
|---|---|---|---|---|---|---|---|---|
| | | | | | Room Temperature | | 150° F. | |
| | | | | | ml. | min. | ml. | min. |
| 1 | None | None | None | None | 204 | [1]1.75 | 196.5 | [1]0.75 |
| 2 | None | 1.0 | 0.07 | 50 | 8 | 30 | 39 | 30 |
| 3 | 0.02 | 1.0 | 0.07 | 50 | 8 | 30 | 26 | 30 |
| 4 | 0.06 | 1.0 | 0.07 | 50 | 5.5 | 30 | 11.5 | 30 |
| 5 | 0.12 | 1.0 | 0.07 | 50 | 4.5 | 30 | 10 | 30 |
| 6 | 0.18 | 1.0 | 0.07 | 50 | 5.5 | 30 | 9 | 30 |
| 7 | 0.24 | 1.0 | 0.07 | 50 | 7.5 | 30 | 15 | 30 |
| 8 | 0.30 | 1.0 | 0.07 | 50 | 8 | 30 | 50.5 | 30 |
| 9 | 0.36 | 1.0 | 0.07 | 50 | | | 163 | [1]1.08 |
| 10 | 0.42 | 1.0 | 0.07 | 50 | | | 171 | [1]0.83 |
| 11 | None | 0.5 | 0.07 | 25 | 17.5 | 30 | 102 | 30 |
| 12 | 0.02 | 0.5 | 0.07 | 25 | 15 | 30 | 63.5 | 30 |
| 13 | 0.06 | 0.5 | 0.07 | 25 | 14 | 30 | 29 | 30 |
| 14 | 0.09 | 0.5 | 0.07 | 25 | 10 | 30 | 21 | 30 |
| 15 | 0.12 | 0.5 | 0.07 | 25 | 8.5 | 30 | 22 | 30 |
| 16 | 0.15 | 0.5 | 0.07 | 25 | 8 | 30 | 17.5 | 30 |
| 17 | 0.18 | 0.5 | 0.07 | 25 | 12.5 | 30 | 31 | 30 |
| 18 | 0.24 | 0.5 | 0.07 | 25 | 14.5 | 30 | 81 | 30 |
| 19 | 0.30 | 0.5 | 0.07 | 25 | 16.0 | 30 | 185 | [1]0.75 |
| 20 | None | 0.25 | 0.07 | 12.5 | 29.5 | 30 | 173 | 30 |
| 21 | 0.02 | 0.25 | 0.07 | 12.5 | 26 | 30 | 85 | 30 |
| 22 | 0.06 | 0.25 | 0.07 | 12.5 | 21.5 | 30 | 71.5 | 30 |
| 23 | 0.09 | 0.25 | 0.07 | 12.5 | 18.5 | 30 | 69 | 30 |
| 24 | 0.12 | 0.25 | 0.07 | 12.5 | 13 | 30 | 39 | 30 |
| 25 | 0.15 | 0.25 | 0.07 | 12.5 | 14.5 | 30 | 41 | 30 |
| 26 | 0.18 | 0.25 | 0.07 | 12.5 | 16 | 30 | 84.5 | 30 |
| 27 | 0.24 | 0.25 | 0.07 | 12.5 | 21 | 30 | 189 | [1]1.16 |
| 28 | None | 0.125 | 0.07 | 6.5 | 57 | 30 | 174 | [1]2.25 |
| 29 | 0.02 | 0.125 | 0.07 | 6.5 | 34 | 30 | 156 | 30 |
| 30 | 0.06 | 0.125 | 0.07 | 6.5 | 34 | 30 | 98 | 30 |
| 31 | 0.09 | 0.125 | 0.07 | 6.5 | 31.5 | 30 | 92.5 | 30 |
| 32 | 0.12 | 0.125 | 0.07 | 6.5 | 30.5 | 30 | 124.5 | 30 |
| 33 | 0.15 | 0.125 | 0.07 | 6.5 | 29 | 30 | 185 | [1]1.42 |

[1] Total dehydration.

The preferred operating range of borax is from the lowest percentage giving a satisfactorily low water loss at room temperature to the amount which causes excessive loss of water at high temperatures (150° F.). The optimum ranges of borax, i. e., the amount which gives the best results for different percentages of PVA is as follows:

*Percent by weight of cement*

| Amount of PVA, percent | Amount of $Na_2B_4O_7 \cdot 10H_2O$, percent |
|---|---|
| 1.0 | 0.06–0.24 |
| 0.5 | 0.09–0.18 |
| 0.25 | 0.09–0.15 |
| 0.125 | 0.06–0.09 |

A second series of tests for stiffening time and strength, at various temperatures, was made with a composition containing 0.12% borax and up to .50% PVA. These thickening time and strength tests were made at 140°, 160°, 180° and 200° F. The Halliburton Consistometer and strength tests were made according to methods given in the API Code No. 32 (1st edition), "Testing Cements Used in Wells." The results of these tests are given in Table II below. These data show that borax tends to improve the retarding properties of starch at elevated temperatures and does not materially affect the early strength. It will be noted that substantially equal stiffening times are obtained at all four temperatures.

TABLE II

Composition, Percent by weight of Cement:
Cement, ASTM Type II, Typical
Modified Starch, 0.07%
Tributyl phosphate—
25 ml./sack for 0.50% PVA
12.5 ml./sack for 0.25% PVA

| Temp., °F. | Borax, Percent | PVA, Percent | Viscosity in Poises—Time | | | | | | | | | Stiffening Time | | Compressive Strength in 24 hr., p. s. i. |
|---|---|---|---|---|---|---|---|---|---|---|---|---|---|---|
| | | | 0 | 0:15 | 0:30 | 1:00 | 2:00 | 3:00 | 4:00 | 5:00 | 6:00 | hr. | min. | |
| 140 | None | None | 6 | 5 | 5 | 6 | 7 | 7 | 18 | 48 | | 5 | 34 | 1,906 |
| 140 | 0.12 | 0.25 | 5 | 6 | 6 | 6 | 7 | 7 | 8 | 28 | 68 | 6 | 35 | 1,450 |
| 140 | 0.12 | 0.50 | 6 | 6 | 6 | 6 | 7 | 7 | 12 | 22 | 44 | 7 | 05 | 1,039 |
| 160 | None | None | 3 | 6 | 6 | 7 | 7 | 7 | 7 | 10 | 48 | 6 | 10 | 2,257 |
| 160 | 0.12 | 0.25 | 4 | 4 | 4 | 5 | 5 | 6 | 6 | 9 | 48 | 6 | 30 | 1,760 |
| 160 | 0.12 | 0.50 | 7 | 6 | 6 | 6 | 6 | 6 | 6 | 9 | 30 | 7 | 05 | 1,651 |
| 180 | None | None | 3 | 5 | 5 | 8 | 13 | 13 | 12 | 53 | | 5 | 48 | 2,225 |
| 180 | 0.12 | 0.25 | 8 | 5 | 5 | 6 | 6 | 6 | 7 | 14 | | 5 | 40 | 1,860 |
| 180 | 0.12 | 0.50 | 7 | 5 | 5 | 6 | 7 | 7 | 7 | 8 | 8 | 7 | 20 | 1,991 |
| 200 | None | None | 2 | 5 | 5 | 11 | 12 | 19 | 44 | | | 4 | 30 | |
| 200 | 0.12 | 0.25 | 4 | 5 | 5 | 6 | 6 | 7 | 8 | 17 | | 5 | 35 | |
| 200 | 0.12 | 0.50 | 7 | 5 | 5 | 7 | 8 | 11 | 13 | 48 | | 5 | 15 | |

Instead of borax, equivalent amounts of boric acid or alkali salts thereof may be used as shown by the examples listed in Table III below. Specifically, these examples are ortho-boric, meta-boric and tetra-boric acids, and the sodium and potassium salts thereof.

TABLE III

| Boron Compound | | | | Water-Loss at Temperature Indicated (on No. 50 Whatman Paper), ml. in 30 min. at 100 p. s. i. | |
|---|---|---|---|---|---|
| Common Name | Formula | Amount, Percent | Borax Equivalent[1], Percent | Room Temperature | 150° F. |
| None | | None | None | 29.5 | 173.0 |
| Boric Acid, (Ortho-) | $H_3BO_3$ | 0.078 | 0.12 | 23.5 | 44.5 |
| Potassium Dihydrogen Borate | $KH_2BO_3$ | 0.084 | 0.08 | 17.0 | 47.0 |
| Sodium Dihydrogen Borate | $NaH_2BO_3$ | 0.106 | 0.12 | 13.5 | 37.5 |
| Boric Acid, (Meta-) | $HBO_2$ | 0.030 | 0.065 | 13.0 | 53.5 |
| Sodium Meta-borate | $NaBO_2$ | 0.053 | 0.12 | 19.5 | 53.5 |
| Potassium Meta-borate | $KBO_2$ | 0.103 | 0.12 | 19.0 | 45.0 |
| Boric Acid, (Tetra-) | $H_2B_4O_7$ | 0.0495 | 0.12 | 16.0 | 46.0 |
| Sodium Tetra-borate (Borax) | $Na_2B_4O_7$ | 0.120 | 0.12 | 13.0 | 39.0 |
| Potassium Tetra-borate | $K_2B_4O_7$ | 0.102 | 0.12 | 18.0 | 49.0 |

[1] Based on $B_2O_3$ content.

Instead of tributyl phosphate, other defoaming agents may be used in similar amounts, such as N-decanol, polypropylene glycol (2025), diethylene glycol mono-laurate, 2-para-tert butyl phenoxy ethyl acetate, or para-tert amyl phenoxy ethanol.

In tests with various inorganic chemicals, it was also found that two other salts, namely sodium and potassium sulfate, are effective in lowering the water-losses of slurries made from the mixture of Portland cement plus polyvinyl alcohol (PVA). When about 0.60 to 1.10% of either of these salts, by weight of cement, is added, the water-losses at room temperature and at 150° F. are lowered by approximately 50%. With 0.5% PVA and 0.60 to 1.10% $K_2SO_4$ or $Na_2SO_4$ by weight of cement, approximately the same water loss is obtained as from a mixture containing 1% PVA with no added salts. Thus, the addition of these chemicals lowers the amount of PVA required to give cement the desired low water loss by approximately one-half. These compositions can readily be retarded at high temperatures with modified starch and the foaming tendency of PVA can be minimized by the use of small amounts (.015–.12% by weight of cement) of tributyl phosor the other defoaming agents mentioned above.

Although we have disclosed herein the preferred embodiment of our invention, we intend to cover as well any change or modification therein which may be made without departing from the spirit and scope of the invention.

We claim:

1. A cement composition comprising Portland cement, from .1 to 2% polyvinyl alcohol, from .02 to .30% of a compound selected from the group consisting of ortho-boric, meta-boric and tetra-boric acids and the sodium and potassium salts thereof, and from .015 to 0.12% of a defoaming agent, all said percentages being by weight of cement.

2. A cement composition comprising Portland cement, from .1 to 2% polyvinyl alcohol, from .02 to .30% of a compound selected from the group consisting of ortho-boric, meta-boric and tetra-boric acids, and the sodium and potassium salts thereof, and from .015 to .12% of tributyl phosphate, all said percentages being by weight of cement.

3. A slurry useful in cementing wells comprising essentially water, Portland cement, from .1 to 1% polyvinyl alcohol, from .06 to .24% of a compound selected from the group consisting of ortho-boric, meta-boric and tetra-boric acids and the sodium and potassium salts thereof, and from .015 to 0.12% of a defoaming agent, all said percentages being by weight of cement.

4. A cement composition comprising Portland cement, from .1 to 2% polyvinyl alcohol, from .02 to .30% of a compound selected from the group consisting of ortho-boric, meta-boric and tetra-boric acids and the sodium and potassium salts thereof, both said percentages being by weight of cement, and a defoaming agent.

5. A cement composition comprising Portland cement, from .1 to 1% polyvinyl alcohol, from .06 to .24% of a compound selected from the group consisting of ortho-boric, meta-boric and tetra-boric acids and the sodium and potassium salts thereof, both said percentages being by weight of cement, and a defoaming agent.

6. A slurry useful in cementing wells comprising essentially water, Portland cement, from .1 to 2% polyvinyl alcohol, from .02 to .30% of a compound selected from the group consisting of ortho-boric, meta-boric and tetra-boric acids and the sodium and potassium salts thereof, both said percentages being by weight of cement, and a defoaming agent.

MATTHEW J. BORIS.
NORMAN C. LUDWIG.

No references cited.